UNITED STATES PATENT OFFICE.

CLIFFORD N. BOURNE, OF SYRACUSE, NEW YORK.

METHOD OF MAKING A LIQUID BEVERAGE.

1,042,074.  Specification of Letters Patent.  Patented Oct. 22, 1912.

No Drawing.  Application filed March 4, 1912.  Serial No. 681,622.

*To all whom it may concern:*

Be it known that I, CLIFFORD N. BOURNE, of Syracuse, in the county of Onondaga, in the State of New York, have invented new and useful Improvements in Methods of Making a Liquid Beverage, of which the following, taken in connection with the accompanying drawings, is a full, clear, and exact description.

This invention relates to certain improvements in liquid compounds and method of making the same, and refers more particularly to a liquid beverage made of certain ingredients and under requisite conditions of treatment, as follows: The basis or total amount of liquid to be manufactured at a single time is taken as eighty-four gallons, using therefore an eighty-four-gallon white oak cask, and the time for completing the manufacture of such a quantity is twenty-four days, certain combinations of the ingredients being compounded in the following manner, viz: I dissolve in a tank or large tub two hundred pounds of granulated sugar by adding forty-eight gallons of pure water, and then put the liquid into the eighty-four gallon cask, previously mentioned, which must be horsed upright with a tap six inches from the bottom, and then add twenty-two gallons of pure spirit, five per cent. over proof, and then stir well and leave for the first day. I put into the cask five gallons of pure lime juice, ten drams of oil of cassia, (essence), six drams of oil of clove (essence) and three drams of oil of almond (essence), said essences being first dissolved in a pint of strong spirit before putting into the cask, the composition being then stirred well and left for the second day. I then take the whites of sixteen eggs, beat them up well in a pail, then dissolve two ounces of isinglass in a pint of hot water in another pail. When this isinglass is dissolved, it is mixed with the eggs and the whole beaten together until cool, after which this latter composition is put into the cask, stirred thoroughly and then the bung of the cask placed in position and left for the third day. The cask is then horsed upright and not disturbed or shaken for twenty-one successive days, whereupon the beverage will be ready for bottling, care being taken not to bottle the first gallon drawn off as the same may contain a little sediment.

What I claim is:—

The herein described method of making a liquid beverage consisting in dissolving a predetermined quantity of sugar in a suitable quantity of water, and then adding to this solution substantially half the quantity of pure spirit, about five per cent. over proof, then stirring this composition and leaving it for about twenty-four hours; then adding to the composition made suitable flavors, consisting of pure lime juice, and the essences of cassia, almond and clove dissolved in a pint of strong spirit and afterward put into the cask and the whole thoroughly stirred and left for another period of twenty-four hours; then mixing with the resulting composition the whites of a suitable number of eggs, together with a relatively small quantity of isinglass, separately dissolved in a pint of hot water, and then mixed with the eggs and the whole beaten together until cool; then stirring the entire composition in the receptacle and sealing the same air-tight and leaving it for a period of approximately twenty-one days before using.

In witness whereof I have hereunto set my hand on this 2nd day of March 1912.

CLIFFORD N. BOURNE.

Witnesses:
H. E. CHASE,
F. B. COLCUTT.